Jan. 12, 1965   C. C. PEARSON   3,164,943
TREE SHAKER
Filed Oct. 17, 1962
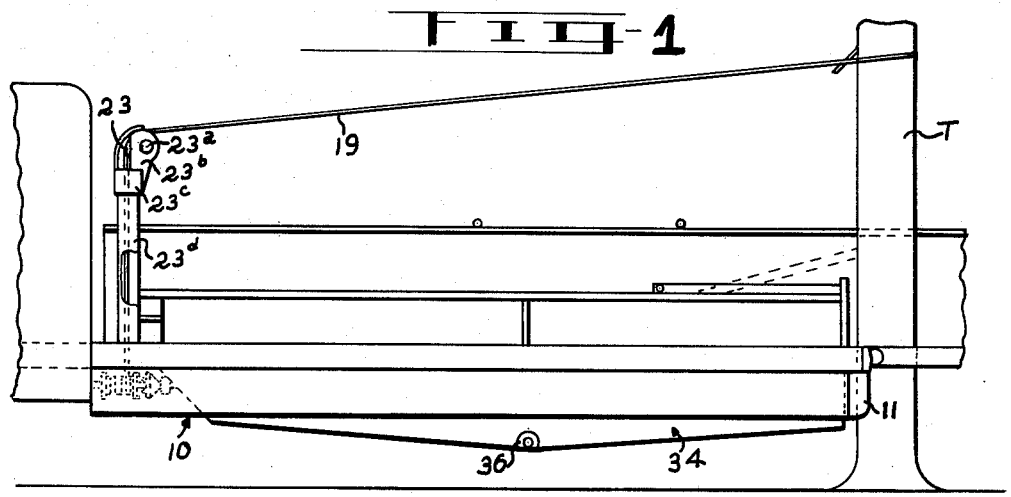
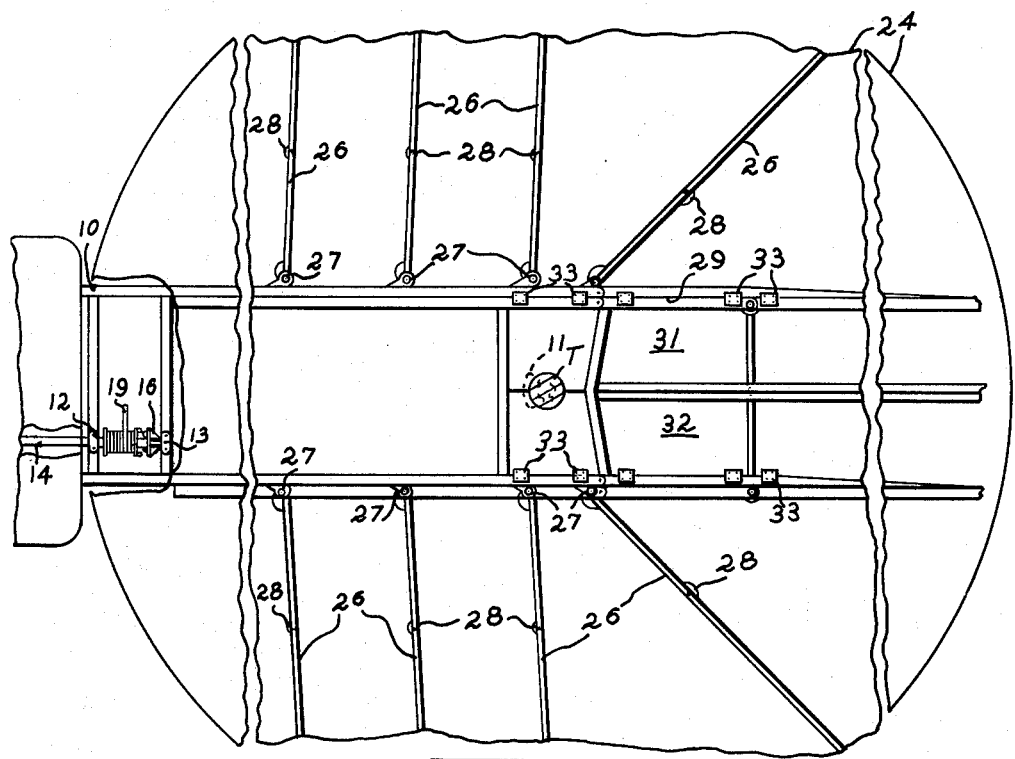
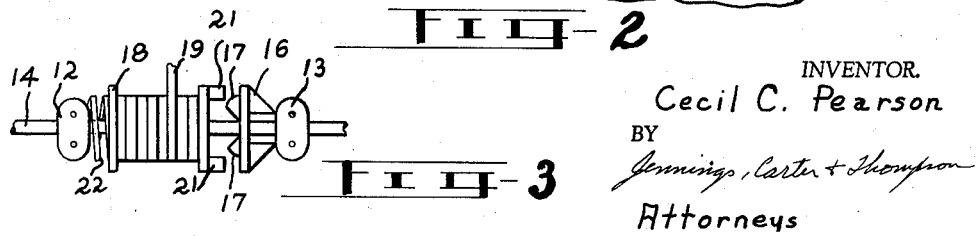
INVENTOR.
Cecil C. Pearson
BY
Jennings, Carter & Thompson
Attorneys

United States Patent Office 3,164,943
Patented Jan. 12, 1965

3,164,943
TREE SHAKER
Cecil C. Pearson, Cuba, Ala., assignor of forty percent to William A. Ganguet, Cuba, Ala.
Filed Oct. 17, 1962, Ser. No. 231,092
8 Claims. (Cl. 56—329)

This invention relates to a tree shaker and more particularly to improved means for shaking nut or fruit bearing trees whereby the nuts or fruit may be removed from the trees with a minimum of effort and without damage to the tree.

An object of my invention is to provide a tree shaker of the character designated which shall impart vibratory motion to the tree at points spaced vertically from each other whereby maximum vibration is imparted to the tree.

Another object of my invention is to provide a tree shaker of the character desingated which shall include improved means for receiving the nuts or the like as they fall from the tree, thereby eliminating the necessity of having to harvest the nuts from the ground.

A further object of my invention is to provide a tree shaker of the character designated which shall be adapted to apply a predetermined pressure to the tree as vibratory motion is imparted thereto, thereby adapting the apparatus for shaking trees of various sizes.

A still further object of my invention is to provide a tree shaker of the character designated which shall be simple of construction, economical of manufacture and one which shall require a minimum of labor for the operation thereof.

As is well known in the art to which my invention relates, it is very difficult to harvest nut crops, such as pecans, for the reason that it is difficult to shake the pecans loose from the tree and after the pecans have been shaken from the tree, the removal of the nuts from the ground is a very arduous task. To overcome these difficulties, I provide improved means for imparting vibratory motion to the tree whereby the nuts are all removed from the tree with a minimum of effort. To eliminate the task of gathering the nuts from the ground, I mount a sheet of material beneath the tree in position to surround the trunk thereof whereby the nuts are collected in the sheet of material and then transferred to a collecting chamber for easy removal to a bag or other container for the nuts.

Apparatus embodying features of my invention is illustrated in the accompanying drawing, forming a part of this application, in which;

FIG. 1 is a side elevational view of the tree shaker, partly broken away;

FIG. 2 is a top plan view of the apparatus shown in FIG. 1, partly broken away and in section; and, FIG. 3 is an enlarged fragmental view showing the means for imparting vibratory motion to the tree.

Referring now to the drawing for a better understanding of my invention, I show a translatable frame 10 which may be in the form of a vehicle, such as a truck, tractor or the like. Mounted adjacent the rear of the frame 10 is a tree engaging member 11 which is adapted to engage the lower portion of the trunk of the tree T as shown in FIGS. 1 and 2. Preferably, the tree engaging member 11 is formed of a resilient material, such as rubber, whereby the trunk of the tree not damaged.

Mounted for rotation adjacent the forward portion of the frame 10 in suitable bearings 12 and 13 is a drive shaft 14 which may be driven by suitable means, such as a power takeoff from the motor for the vehicle. Secured to the drive shaft 14 and adapted for rotation therewith is a rotatable member 16. Angularly spaced detents 17 are carried by rotatable member 16, as shown in FIG. 3.

Mounted for rotation on the shaft 14 is a drum 18 having one end of a flexible member, such as a cable 19, mounted thereon. Angularly spaced detents 21 are carried by the end of the drum 18 adjacent the rotatable member 16 in position to engage the detents 17. To urge the detents 21 toward the detents 17, a compression spring 22 surrounds the drive shaft 14 between the drum 18 and the bearing 12. Accordingly, as the rotatable member 16 is rotated by the shaft 14, the detents 17 engage the detents 21 to thereby impart rotary motion to the drum 18.

The flexible member 19 extends upwardly from the drum 18 and passes over a sheave 23 whereby the free end of the flexible member 19 is positioned above the frame 10 and is adapted for attachment to the trunk of the tree T at a substantial elevation above the tree engage member member 11. The sheave 23 is mounted on a shaft 23a which is supported by vertical members 23b. The members 23b are carried by a member 23c which is adapted for pivotal movement relative to a supporting cylidrical indicated at 23d. Accordingly the sheave 23 is carried by a swivel support which aligns the sheave 23 with the tree T automatically without having to align the frame 10 with the tree.

To catch the nuts as they fall from the tree, I mount a generally circular sheet of material 24 on the frame 10 in position to surround the trunk of the tree T, as shown in FIG. 2. Preferably, the sheet of material 24 is formed of a light material, such as nylon or the like, and is supported in extended position by extendible members 26 which are hingedely connected to the frame as at 27. Also, hinge connections 28 are provided intermediate the ends of the members 26 whereby the entire sheet of material 24 may be collapsed.

To position the tree T adjacent the center of the sheet of material 24, an elongated gap or opening 29 is provided adjacent the rear of the frame 10. The gap 29 is closed by a plurality of closure members 31 and 32 which are hingedly mounted on the frame adjacent opposite sides of the gap 29 by suitable hinges 33 whereby the inner portions of the member 31 and 32 may be elevated for insertion of the tree T into the center of the sheet of material 24. After the sheet of material 24 has been moved to a position whereby the tree T is adjacent the center thereof, the closure members 31 and 32 are lowered to the position shown in FIG. 2 whereby a substantially continuous sheet of material is provided around the trunk of the tree T. The sides of the sheet of material 24 slope inwardly toward the longitudinal center of the frame 10 whereby the nuts move toward the center of the frame as they fall onto the sheet of material 24.

The bottom of the frame 10 is in the form of an elongated hopper 34 which slopes toward the center thereof, as shown in FIG. 1. Mounted in the bottom central portion of the hopper 34 is a transverse conveyor 36 for removing the nuts from the hopper 34. The conveyor 36 may be in the form of a conventional screw-type conveyor.

From the foregoing description, the operation of my improved tree shaker will be readily understood. The members 31 and 32 are pivoted upwardly whereby the trunk of the tree T is adapted to move to the position shown in FIG. 2. The members 31 and 32 are then pivoted downwardly whereby the sheet of material 24 completely surrounds the tree T. The free end of the flexible member 19 is then secured to the upper portion of the tree trunk, as shown in FIG. 1. In this position, the resilient member 11 engages the lower portion of the trunk of the tree while the flexible member 19 is secured to an upper portion of the trunk. Rotary motion is imparted to the shaft 14 whereby the rotatable member 16 rotates therewith. As the detents 17 rotate, the spring 22 urges the drum 18 and the detents 21 carried thereby into engagement with the detents 17 whereby the drum 18 rotates with the rotatable member 16. The drum 18 continues to rotate until the flexible member 19 becomes tight. After a predetermined pressure is exerted on the flexible member 19, the detents 17 and 21 slip relative to each other, thereby imparting vibratory motion to the flexible member 19 and the tree T. That is, the spring 22 urges the drum 18 toward the rotatable member 16 but allows the detents 17 and 21 to ride over each other when a predetermined amount of torque is applied. This continuous movement of the detents 17 and 21 relative to each other imparts considerable vibration to the flexible member 19 and the tree T.

Since the resilient member 11 engages the lower portion of the trunk of the tree T, vibratory motion is also imparted to the tree of this point. That is to say, as the flexible member 19 is successively tightened and released, the resilient member 11 tends to steady the machine relative to the lower portion of the tree trunk.

As the nuts, such as pecans or the like, fall onto the sheet of material 24 they roll toward the longitudinal center of the frame 10 and thence into the hopper 34 where they are removed by the transverse conveyor 36. The nuts are then delivered into suitable containers, such as bags or the like.

From the foregoing, it will be seen that I have devised an improved tree shaker. By providing means for imparting vibratory motion to the trunk of the tree at vertically spaced points, considerable vibration is imparted to the entire tree whereby the nuts are removed from the tree and at the same time the tree is not damaged in any manner. By providing a relatively light sheet of material which slopes inwardly toward the longitudinal center of the frame, the nuts are continuously conveyed toward the hopper 34 as they fall onto the sheet of material 24, thereby eliminating the difficult task of picking up pecans from the ground.

While I have shown my invention in but one form, it will be obvious to those skilled in the art that it is not so limited, but is susceptible of various changes and modifications without departing from the spirit thereof, and I desire, therefore, that only such limitations shall be placed thereon as are specifically set forth in the appended claims.

What I claim is:
1. A tree shaker comprising,
   (a) a translatable frame,
   (b) a tree engaging member carried by said frame in position to engage the trunk of a tree,
   (c) a drum mounted for rotation on said frame,
   (d) a flexible member having one end thereof wound about said drum with the other end thereof being adapted for attachment to the tree at a point above and in spaced relation to said tree engaging member,
   (e) a rotatable member mounted adjacent said drum,
   (f) at least one detent carried by said rotatable member,
   (g) at least one detent carried by said drum in position to engage said detent carried by said rotatable member,
   (h) resilient means imparting relative axial movement between said drum and said rotatable member to urge the detent carried by said rotatable member and the detent carried by said drum toward each other as said rotatable member rotates,
   (i) said detent carried by said drum and said detent carried by said rotatable member being adapted for angular movement relative to each other upon application of a predetermined amount of torque to said rotatable member, and
   (j) means to apply said predetermined amount of torque to said rotatable member whereby relative angular movement is imparted between said detents to vibrate said flexible member.

2. A tree shaker as defined in claim 1 in which a sheet of material is supported by said frame in position to surround the trunk of the tree being shaken.

3. A tree shaker as defined in claim 2 in which extensible support members are mounted on said translatable frame for supporting said sheet of material.

4. A tree shaker as defined in claim 2 in which the sheet of material is supported whereby it slopes inwardly, and a receiving chamber is mounted beneath said sheet of material, there being a passageway through said sheet of material in communication with said receiving chamber whereby articles falling onto said sheet of material pass into said receiving chamber.

5. A tree shaker as defined in claim 1 in which a sheave is mounted at an elevation above said drum for receiving said flexible member whereby said flexible member is supported at an elevation above said frame.

6. A tree shaker as defined in claim 1 in which the resilient means imparting relative axial movement between the drum and said rotatable member comprises a compression spring.

7. A tree shaker comprising,
   (a) a translatable frame,
   (b) a tree engaging member carried by said frame in position to engage the trunk of a tree,
   (c) a drum mounted for rotation on said frame,
   (d) a flexible member having one end thereof wound about said drum with the other end thereof being adapted for attachment to the tree at a point above and in spaced relation to said tree engaging member,
   (e) a rotatable member mounted adjacent an end of said drum and adapted for rotation about a common axis with said drum,
   (f) angularly spaced detents carried by said rotatable member and projecting inwardly toward said drum,
   (g) angularly spaced detents carried by said end of the drum adjacent said rotatable member and projecting outwardly toward the detents carried by said rotatable member,
   (h) resilient means imparting relative axial movement between said drum and said rotatable member to urge the detents carried by said rotatable member and the detents carried by said drum toward each other as said rotatable member rotates,
   (i) said detents carried by said drum and said detents carried by said rotatable member being adapted for angular movement relative to each other upon application of a pretedmined amount of torque to said rotatable member, and,
   (j) means to apply said predetermined amount of torque to said rotatable member whereby relative angular movement is imparted between said detents to vibrate said flexible member, 8. A tree shaker comprising,
   (a) a translatable frame,
   (b) a drum mounted for rotation on said frame,
   (c) a flexible member having one end thereof wound about said drum with the other end thereof being adapted for attachment to the tree,
   (d) a rotatable member mounted adjacent said drum,
   (e) at least one detent carried by said rotatable member,
   (f) at least one detent carried by said drum in position to engage said detent carried by said rotatable member,
   (g) resilient means imparting relative axial movement between said drum and said rotatable member to urge the detent carried by said rotatable member and the detent carried by said drum toward each other as said rotatable member rotates, (h) said detent carried by said drum and said detent carried by said rotatable member being adapted for angular movement relative to each other upon application of a predetermined amount of torque to said rotatable member, and
(i) means to apply said predetermined amount of torque to said rotatable member whereby relative angular movement is imparted between said detents to vibrate said flexible member.

References Cited by the Examiner
UNITED STATES PATENTS

| | | | |
|---|---|---|---|
| 2,656,669 | 10/53 | Avansino | 56—328 |
| 2,913,866 | 11/59 | Curtis | 56—329 |
| 2,922,624 | 1/60 | Addicks | 254—187 X |

T. GRAHAM CRAVER, *Primary Examiner.*

RUSSELL R. KINSEY, *Examiner.*